United States Patent [19]

Meyer et al.

[11] Patent Number: 5,219,594
[45] Date of Patent: Jun. 15, 1993

[54] APPARATUS FOR MOLDING UNDERCUT PARTS

[75] Inventors: Leon G. Meyer, Alden; Thomas T. Brylinski, Amherst, both of N.Y.

[73] Assignee: Occidental Chemical Corporation, Niagara Falls, N.Y.

[21] Appl. No.: 925,404

[22] Filed: Aug. 10, 1992

Related U.S. Application Data

[63] Continuation-in-part of Ser. No. 556,157, Jul. 23, 1990, abandoned.

[51] Int. Cl.⁵ .................. B29C 45/44; B29C 45/67
[52] U.S. Cl. ............................. 425/577; 249/59; 249/64; 249/67; 249/180; 425/588; 425/589; 425/414; 425/422; 425/443; 425/444; 425/451.5; 425/DIG. 58
[58] Field of Search ............... 425/577, 468, 588, 441, 425/443, 444, DIG. 58, 188, 451.5, 589, 450.1, 451, 454, 411, 414, 422; 249/56, 59, 64, 67, 184, 186, 180, 160, 161, 162

[56] References Cited

U.S. PATENT DOCUMENTS

| | | | |
|---|---|---|---|
| 2,306,205 | 12/1942 | Crosman, Jr. | 249/59 |
| 3,416,194 | 12/1968 | Miller | 425/443 |
| 3,843,088 | 10/1974 | McLoughlin et al. | 425/DIG. 58 |
| 3,865,529 | 2/1975 | Guzzo | 249/180 |
| 3,905,740 | 9/1975 | Lovejoy | 425/577 |
| 4,125,246 | 11/1978 | Von Holdt | 425/444 |
| 4,362,291 | 12/1982 | Fuke et al. | 425/441 |
| 4,502,660 | 3/1985 | Luther et al. | 425/577 |
| 4,570,897 | 2/1986 | Von Holdt | 249/162 |
| 4,768,747 | 9/1988 | Williams et al. | 425/577 |
| 4,832,307 | 5/1989 | Watanabe et al. | 425/577 |
| 4,840,557 | 6/1989 | Ishimoto et al. | 425/577 |
| 4,854,849 | 8/1989 | Sudo | 425/577 |
| 4,889,480 | 12/1989 | Nakamura et al. | 425/450.1 |
| 4,938,679 | 7/1990 | Pietrorazio | 425/577 |

*Primary Examiner*—Khanh P. Nguyen
*Attorney, Agent, or Firm*—Richard D. Fuerle; Wayne A. Jones

[57] ABSTRACT

Disclosed is a molding apparatus which includes
(A) a mold for making an undercut part which includes coring sandwiched between top and bottom cavity halves, where the coring is divided into three or four sections; and
(B) a press for
  (1) separating the coring from the top and bottom cavity halves; and
  (2) separating the sections from each other.

13 Claims, 3 Drawing Sheets

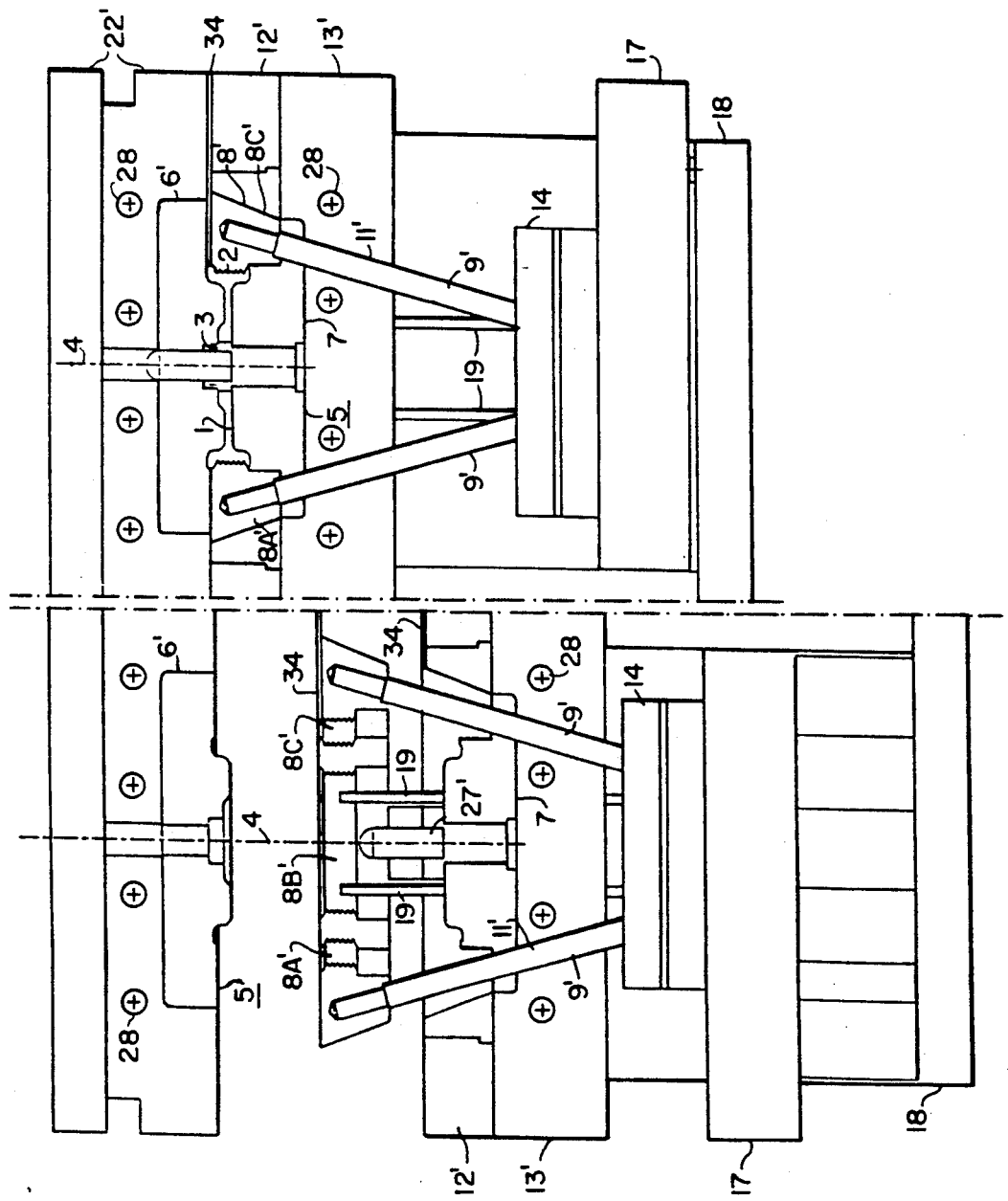

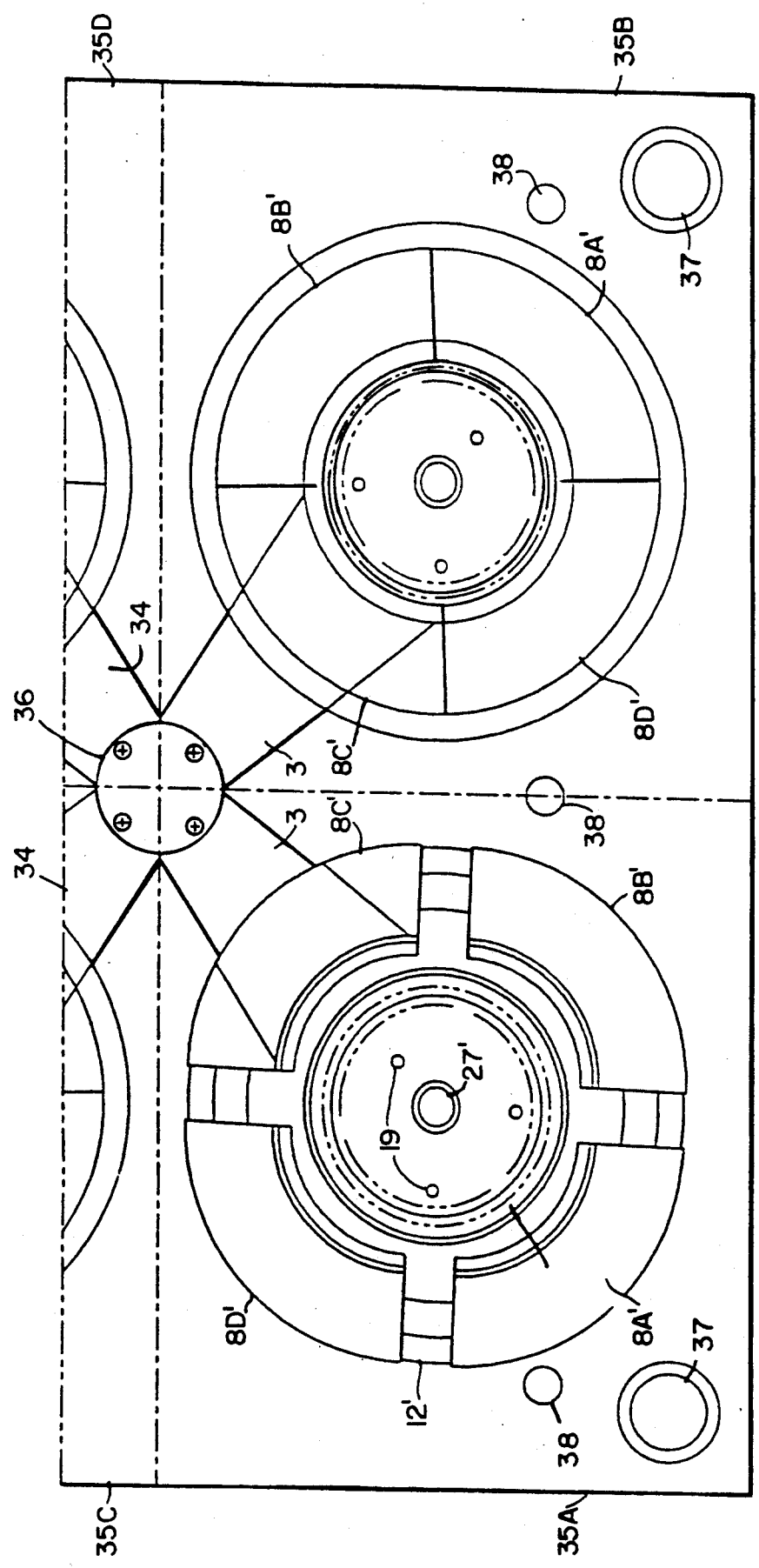

5,219,594

APPARATUS FOR MOLDING UNDERCUT PARTS

This application is a continuation-in-part of application Ser. No. 07/556,157, filed Jul. 23, 1990, and now abandoned.

BACKGROUND OF THE INVENTION

This invention relates to a molding apparatus for molding parts having portions that are undercut. In particular, it relates to a mold having coring that is split into three or four sections, which can be moved by a press away from the remainder of the mold and away from each other.

A conventional mold for making an undercut part consists of front and back cavity halves with a coring in between. The coring contains extensions for making the undercuts and is divided into two sections. A hydraulic press closes the cavity halves against the coring and molding compound, placed within the mold either before closing or injected after closing, is cured, usually by heat, to form a solid part. The hydraulic press then pulls the front cavity half away from the back cavity half. Two additional hydraulic cylinders then pull the two sections of the coring apart in a perpendicular direction, thereby freeing the part from the mold; the part is usually dislodged from the mold by hand.

While this type of molding apparatus will successfully produce an undercut part, it requires considerable space due to the long perpendicular distance the two sections must travel in order to free the part, and to the space required for the two hydraulic cylinders. In addition, if a single hydraulic press is to be used for simultaneously molding several parts, to allow room for the hydraulic cylinders, the molds must be assembled in a row and a hydraulic press must be used that is capable of applying the required pressure over the length of the row. This usually means that a larger press is required than would be needed to supply the required pressure because few presses are made that are large enough to handle that distance but are low capacity. For example, a 500 ton press would probably be needed to handle four molds one square foot in area even though a 250 ton press would be adequate for the amount of pressure required. Of course, a larger press adds to the cost of producing the part.

SUMMARY OF THE INVENTION

We have discovered a unique molding apparatus for molding undercut parts. In the molding apparatus of this invention, no hydraulic cylinders are used to pull apart the sections of the coring. Instead, the hydraulic press itself not only separates the front and back cavity halves from the coring, but also separates the sections of the coring by angular lifter pin above the mold surface rather than across it. This is possible because the coring, instead of being made up of two sections, is made up of three or four sections. As a result, the coring sections do not need to be moved as far apart to free the part as would be necessary if the coring consisted of only two sections. Because of the smaller distance that the coring sections must be moved to free the part, and because no transversely moving hydraulic cylinders are present, the apparatus itself requires less space. In addition, if several molds are to be used at the same time by the same hydraulic press, the molds need not be arranged in a row but can now be placed in a square pattern. Because the length of the mold is then less, a smaller capacity hydraulic press can be used. For example, while four molds in a row require a 500 ton press, the same four molds arranged in a square design require only a 250 ton press. Thus, parts can be molded more economically using the apparatus of this invention. Finally, the apparatus of this invention permits the automatic separation and ejection of the part from the mold.

DESCRIPTION OF THE INVENTION

FIG. 1 is a plan view, in section, showing a certain presently preferred embodiment of a compression molding apparatus according to this invention.

FIG. 2 is a plan view, in section, showing a certain presently preferred embodiment of an injection molding apparatus according to this invention. FIG. 2A shows the apparatus in closed position and FIG. 2B shows the same apparatus in open position.

Figure 1A:
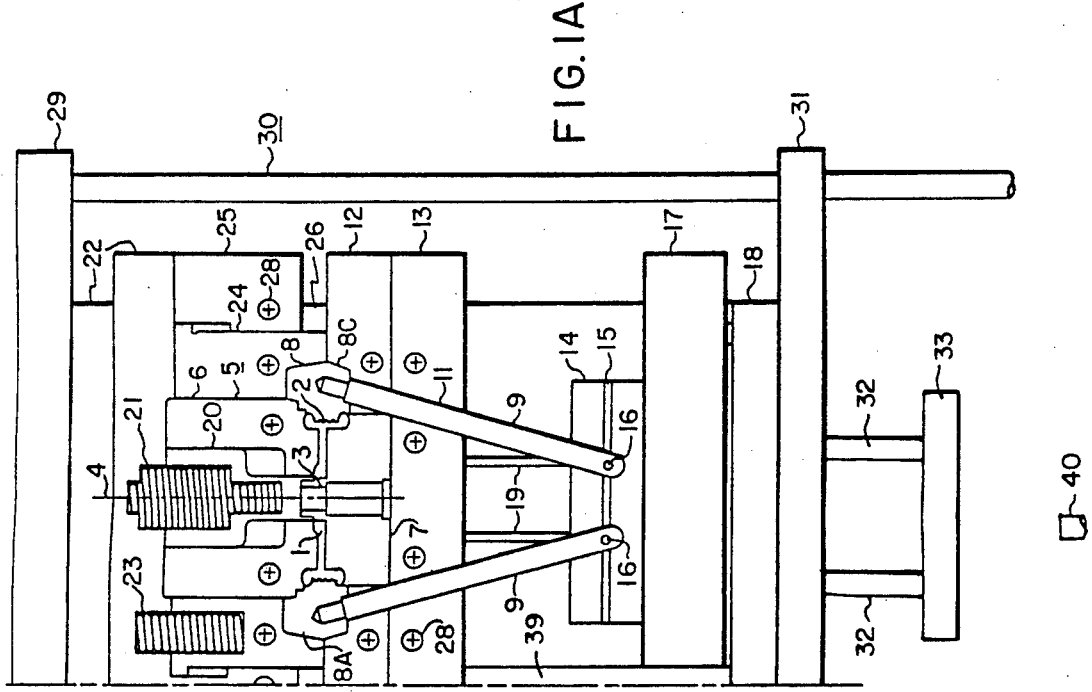
FIG. 1A shows the apparatus in closed position and FIG. 1B shows the same apparatus in open position.

FIG. 3 is a side view, in section, showing a certain presently preferred embodiment of the injection molding apparatus according to this invention, where four cavities have been arranged in a square pattern (only slightly more than two of the cavities being shown). While in an actual apparatus all of the molds would be either opened or closed, for the purposes of illustration, in FIG. 3 the mold on the right has been shown in a closed position and the mold on the left has been shown in an open position.

In FIG. 1, the part 1 being molded is a pulley which has undercut rims 2 and a steel bushing 3 at its axis 4. The mold 5 consists of a top cavity half 6, a bottom cavity half 7, and coring 8. The coring 8 has a circular mold face with undercuts and is divided into four sections, 8A, 8B, 8C, and 8D, only three of which can be see in FIG. 1. (While four sections are preferred, three sections can also be used.) Fixed to each of the four sections of coring 8 is an angular core-lifter 9. Angular core-lifters 9 slide through holes 10 and 11 drilled through retainer plate (or B-plate) 12 and heater plate (or backer plate) 13, respectively.

The ends of angular core-lifters 9, opposite the ends mounted to the coring, engage slide mechanism 14, which permits the ends to move perpendicular to axis 4. Slide mechanism 14 consists of a dovetailed slide 15 along which slides a pin 16 mounted at the end of angular core-lifter 9. Angular core-lifters 9 can also be mounted to slide mechanism 14 in ways other than that shown in FIG. 1. For example, an angular core-lifter 9 can have an aperture at its end through which passes a perpendicular rod that it slides over. Slide mechanism 14 is mounted on ejector plate 17 and moves in an axial direction. Also in the lower half of the apparatus are ejector pins 19, which push part 1 away from bottom cavity half 7 when the mold is opened.

Figure 1B:
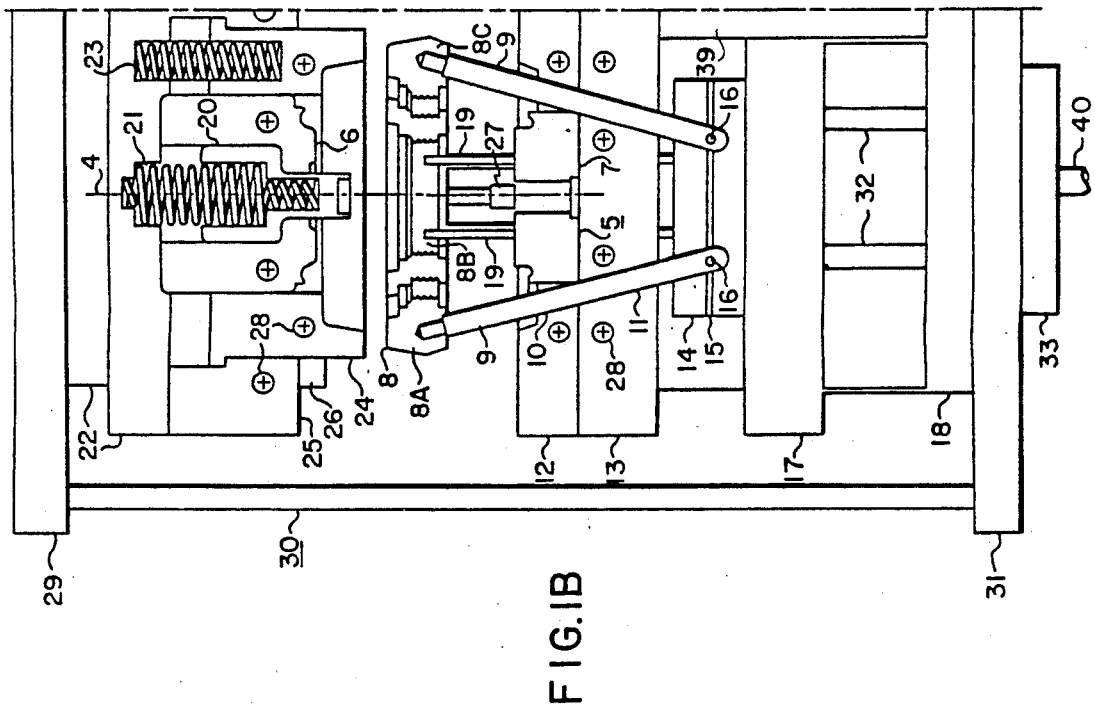

In the top half of the mold, an insert capping pin 20 resides within top cavity half 6 and contains capping spring 21, shown in a compressed position in FIG. 1A and in a released position in FIG. 1B. Capping spring 21 causes insert capping pin 20 to hold bushing 3 against bottom cavity half 7 when the mold is closed. Capping spring 21 pushes against top clamp plate 22 which also holds four split retainer springs 23 (only one of which is shown). Split retainer spring 23 partially resides within retainer 24 and is shown in a compressed condition in FIG. 1A and in a released position in FIG. 1B. The purpose of split retainer springs 23 is to hold the four sections of coring, 8A, 8B, 8C, and 8D, against retainer plate 12 when the mold is closed. Retainer 24 is contained within A-plate 25; stop lock 26 limits the movement of A-plate 25 when the mold is closed. Also shown is insert pin 27 which aligns and positions steel bushing 3, and numerous cartridge heaters 28 which heat the mold. Top clamp plate 22 is attached to stationary platen 29 of hydraulic press 30 and bottom clamp plate 18 is attached to heater plate 13 by ejection box 39 (only one side shown) and to moveable platen 31. Ejector plate 17 is attached to pins 32 which are in turn attached to the ejector mechanism 33 of the hydraulic press. The downward movement of ejector mechanism 33 is stopped by ejector activator 40.

To operate the apparatus, the hydraulic press is activated pushing movable platen 31 upward, which moves bottom clamp plate 18 toward ejector plate 17 and retainer plate 12 away from ejector plate 17, seating sections 8A, 8B, 8C, and 8D in retainer plate 12. Bushing 3 is placed in position and a plug of molding compound is placed within the mold. The hydraulic press then closes the mold to the position shown in FIG. 1A. As the mold closes, the molding compound melts, flows throughout the mold, and solidifies. (As is well known in the art, the mold is provided with vents, not shown, to permit the release of air.) The mold is then opened, by the reverse process, to the position shown in FIG. 1B. Ejector pins 19 automatically eject the pulley from the mold.

FIG. 2 shows an injection molding apparatus, but does not show the hydraulic press or the details of slide mechanism 14. In FIG. 2 the parts that are identical to those in FIG. 1 are numbered the same as in FIG. 1, and the parts that are similar, but slightly different, are given the same number with a prime mark after the number. To operate the apparatus, the mold is closed (by the procedure described for FIG. 1) and liquid molding compound is injected into the mold through runner 34 by means of, for example, a screw extruder (not shown). The mold is then opened, and ejector pins 19 automatically eject the pulley from the mold.

In FIG. 3, four mold cavities, 35A, B, C, and D, such as those shown in FIG. 2, have been assembled into a square pattern. A screw bushing 36 has been provided to admit molding compound into the four runners 34. Additional parts that can be seen in FIG. 3 include guide pins 37 for aligning retainer 12 with A-plate 25, and pushback pins 38 which push back ejector plate 17 in case a malfunction prevents it from otherwise being pushed back.

While the drawings illustrate certain presently preferred embodiments of this invention, it will be apparent to those skilled in the art that other embodiments can also achieve the functions of this invention. For example, instead of simultaneously moving the sections of the coring away from each other and away from the top and bottom cavity halves, it is also possible to have one of the movements occur before the other movement. Similarly, the ejector pins may push against the part as the mold is being opened, or they may push against the part only after the mold is fully opened. Also, the 3 or 4 coring sections need not be identical in shape or size, and they need not be cut along planes parallel to axis 4, though the planes cannot be normal to axis 4 and planes parallel to axis 4 are preferred. And finally, while the drawings show the top clamp plate as fixed and the bottom clamp plate as moving, the reverse is also within the scope of this invention as it is only the relative movement of the parts of the molding apparatus that is important. The essence of the invention is that the coring has 3 or 4 sections and that the hydraulic press performs both the function of separating the coring from the top and bottom cavity halves and the function of separating the sections from each other, and embodiments that capture that essence are considered to be within the scope of this invention.

We claim:

1. A molding apparatus for making a molded part having an external undercut comprising
    (A) a single press having a fixed platen and a moveable platen on an axis;
    (B) a mold which comprises
        (1) a fixed cavity half fixed to said fixed platen;
        (2) a moveable cavity half fixed to said moveable platen;
        (3) coring in between said fixed cavity half and said movable cavity half having at least one extension for making said external undercut in said part, where said coring is divided into 3 or 4 sections along planes parallel to said axis;
    (C) a lifter rod for each of said sections, where one end of said lifter rod is rigidly attached to said section and the other end of said lifter rod is closer to said axis; and
    (D) means activated by said single press for moving said lifter rods and said sections towards said axis to close said mold when said single press moves said cavity halves towards each other, and for moving said lifter rods and said sections away from each other and away from said fixed cavity half and said moveable cavity half when said single press moves said cavity halves apart.

2. An apparatus according to claim 1 wherein said coring is divided into 4 sections.

3. An apparatus according to claim 1 wherein each section of said coring is identical.

4. An apparatus according to claim 1 wherein said press opens said mold by moving said top cavity half away from said coring, then moves said coring away from said bottom cavity half while simultaneously moving said sections away from each other.

5. A molding apparatus according to claim 1 including ejector pins for pushing said part molded within said mold away from said mold when said mold opens.

6. A molding apparatus according to claim 1 wherein said mold is a compression mold and has no runners within said mold.

7. A molding apparatus according to claim 1 wherein said mold is an injection mold and has at least one runner within said mold.

8. A molding apparatus according to claim 1 wherein said molding apparatus includes four of said molds arranged in a square pattern and said single press opens and closes said four molds at the same time.

9. A molding apparatus according to claim 1 wherein the portion of said coring that forms said part is circular.

10. A molding apparatus according to claim 1 wherein said means activated by said single press comprises a retainer plate fixed to said moveable platen, having aperatures through which said lifter rods slide, a sliding mechanism to which said other end of each lifter rod is slideably engaged in a direction perpendicular to said axis, and means for moving said sliding mechanism with said retainer plate when said sections of coring are together.

11. A molding apparatus comprising
    (A) a slide mechanism on an axis;

(B) a mold for making a part that is radially symmetrical about said axis and has at least one external undercut extending in a direction perpendicular to said axis, said mold comprising
 (1) a top cavity half on said axis;
 (2) a bottom cavity half on said axis disposed between said top cavity half and said slide mechanism; and
 (3) coring surrounding said part, disposed on said axis in between said top and bottom cavity halves, where at least one of said bottom cavity half and said slide mechanism is moveable along said axis, said coring having extensions for making said external undercut, said coring being divided into four sections by two perpendicular planes that are parallel to said axis;
(C) a single hydraulic press for pressing said top and bottom cavity halves against said coring which has an ejector system operated by said single hydraulic press for changing the distance between said slide mechanism and said bottom cavity half; and
(D) four angular core lifters disposed in directions that are in between parallel to said axis and perpendicular to said axis, where each angular core lifter is rigidly attached at one end to a section of said coring, and is slidably attached at the other end to said slide mechanism so that said angular core lifter slides in a direction perpendicular to said axis, whereby when said mold closes
 (1) said ejector system causes said slide mechanism and said bottom cavity half to separate, causing said sections to move together and against said bottom cavity half; and
 (2) said single hydraulic press presses said coring against said top cavity half.

12. A molding apparatus according to claim 11 including ejector pins for pushing said part molded within said mold away from said mold when said mold is opened.

13. A molding apparatus according to claim 11 wherein said molding apparatus includes four of said molds, arranged in a square pattern, which are opened and closed together by said single hydraulic press.

* * * * *